(12) United States Patent
Lee et al.

(10) Patent No.: US 10,171,164 B2
(45) Date of Patent: Jan. 1, 2019

(54) 2D BARCODE-BASED BI-DIRECTIONAL WIRELESS TRANSMISSION SYSTEM

(71) Applicant: NATIONAL CHUNG CHENG UNIVERSITY, Chia-Yi County (TW)

(72) Inventors: Chang-Ming Lee, Chiayi County (TW); Ze-An Chen, Changhua County (TW); Po-Han Chen, Taipei (TW)

(73) Assignee: NATIONAL CHUNG CHENG UNIVERSITY, Min-Hsiung, Chia-Yi County (TW)

( * ) Notice: Subject to any disclaimer, the term of this patent is extended or adjusted under 35 U.S.C. 154(b) by 0 days.

(21) Appl. No.: 15/487,086

(22) Filed: Apr. 13, 2017

(65) Prior Publication Data

US 2018/0181778 A1 Jun. 28, 2018

(30) Foreign Application Priority Data

Dec. 22, 2016 (TW) .............................. 105142696 A

(51) Int. Cl.
*G06K 7/10* (2006.01)
*H04B 10/116* (2013.01)
*G06Q 10/00* (2012.01)

(52) U.S. Cl.
CPC ........... *H04B 10/116* (2013.01); *G06Q 10/00* (2013.01)

(58) Field of Classification Search
CPC ............. G06F 17/30879; G06F 3/1238; G06F 3/1267; G06F 3/1288; G06K 19/06028; G06K 7/1092; G06K 7/1417
See application file for complete search history.

(56) References Cited

U.S. PATENT DOCUMENTS

| 9,600,701 B1* | 3/2017 | Chien | H04B 10/116 |
| 2011/0101086 A1* | 5/2011 | Yach | G06Q 10/10 |
| | | | 235/375 |
| 2014/0084067 A1* | 3/2014 | Vanderhulst | H04B 10/116 |
| | | | 235/462.01 |

* cited by examiner

*Primary Examiner* — Sonji N Johnson
(74) *Attorney, Agent, or Firm* — Muncy, Geissler, Olds & Lowe, P.C.

(57) ABSTRACT

A 2D barcode-based bi-directional wireless transmission system includes a first apparatus and a second apparatus each including a display screen, a processing system and a camera. The first apparatus encodes a data to be sent into multiple 2D barcode images and sequentially displays these multiple 2D barcode images on the display screen thereof so that the second apparatus sequentially captures the multiple 2D barcode images from the first apparatus, and then decodes the captured multiple 2D barcode images into a received data, and then encodes a feedback information into a 2D barcode image and displays on the display screen thereof for allowing the first apparatus to capture and then to decode the captured 2D barcode image of the feedback information so as to obtain the feedback information.

4 Claims, 4 Drawing Sheets

2D BARCODE-BASED BI-DIRECTIONAL WIRELESS TRANSMISSION SYSTEM

BACKGROUND OF THE INVENTION

1. Field of the Invention

The present invention relates to data transmission technology and more particularly, to a 2D barcode-based bi-directional wireless transmission system.

2. Description of the Related Art

With the development of wireless communication technology, either home or vehicle wireless communication, phone communication, Bluetooth technology or near field communication (NFC) technology will use radio frequency (RF) technology. However, RF technology has electromagnetic interference and electromagnetic compatibility problems. When using RF technology to transmit information, the transmitted information can easily be interfered with noises to lead to transmission failure, and even be side recorded by evil person.

Based on the spectral characteristics that visible light has a short wavelength and is not easy to have signal leakage and electromagnetic interference problems, intelligent mobile devices are generally equipped with a digital camera and a display screen for allowing implementation of visible light signal playback and reception using existing components without needing any extra hardware. Thus, when the display screens of two intelligent mobile devices are respectively aligned with the opposite digital camera, the 2D barcodes displayed on the display screens can be used for bi-directional transmission, thereby creating a wireless transmission technology for the user to select.

SUMMARY OF THE INVENTION

The present invention has been accomplished under the circumstances in view. It is the main object of the present invention to provide a 2D barcode-based bi-directional wireless transmission system, which utilizes the display screens and cameras of the system and the medium of 2D barcodes to achieve bi-directional wireless data transmission.

To achieve this and other objects of the present invention, a 2D-barcode-based bi-directional wireless transmission system comprises a first apparatus and a second apparatus. The first apparatus comprises a display screen, a processing system and a camera. The processing system of the first apparatus has the ability to store information, to execute software and to encode a data to be transmitted into a 2D barcode and also has the ability to capture 2D barcodes of other apparatuses and to decode the captured 2D barcodes. The second apparatus comprises a display screen, a processing system and a camera. The processing system of the second apparatus has the ability to store information, to execute software and to encode a data to be transmitted into a 2D barcode, and also has the ability to capture 2D barcodes of other apparatuses and to decode the captured 2D barcodes. The first apparatus encodes the data to be sent into multiple 2D barcode images, and sequentially displays these multiple 2D barcode images on the display screen thereof. The second apparatus uses the camera thereof to photograph the display screen of the first apparatus so as to sequentially capture the multiple 2D barcode images from the first apparatus, and then decodes these captured multiple 2D barcode images into a received data for storage. The second apparatus encodes a feedback information into a 2D barcode image, and then displays this 2D barcode image on the display screen thereof so that the first apparatus is capable of capturing the 2D barcode image of the feedback information by aiming the camera thereof at the display screen of second apparatus and then decoding the captured 2D barcode image of the feedback information so as to obtain the feedback information.

Thus, by means of using 2D barcode as a medium, the display screens and cameras of the first and second apparatuses can be used to achieve bi-directional wireless signal transmission between the first apparatus and the second apparatus.

Other advantages and features of the present invention will be fully understood by reference to the following specification in conjunction with the accompanying drawings, in which like reference signs denote like components of structure.

DETAILED DESCRIPTION OF THE INVENTION

Figure 1:
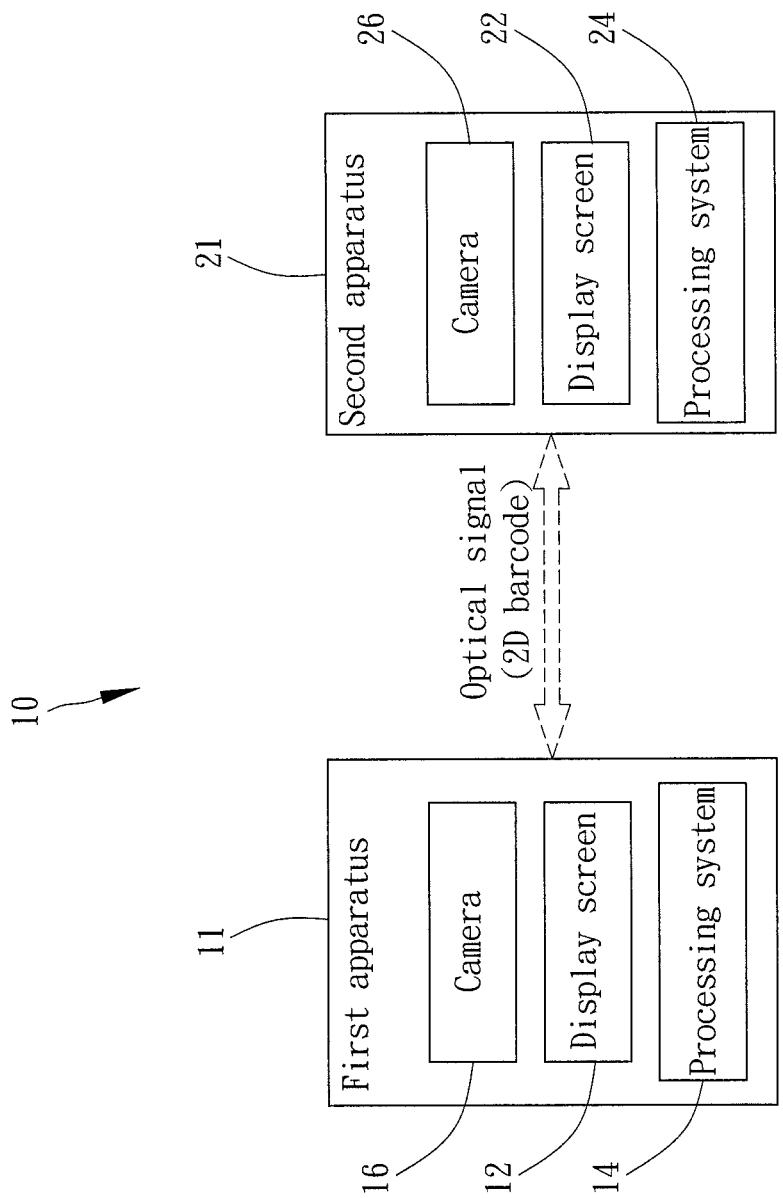
FIG. 1 is a circuit block diagram of a 2D barcode-based bi-directional wireless transmission system in accordance with the present invention.

Referring to FIGS. 1-4, the invention provides a 2D barcode-based bi-directional wireless transmission system 10, which comprises a first apparatus 11 and a second apparatus 21.

The first apparatus 11 comprises a display screen 12, a processing system 14 and a camera 16. The processing system 14 has the ability to store information, to execute software and to encode a data to be transmitted into a 2D barcode. The processing system 14 also has the ability to capture 2D barcodes of other apparatuses through the camera 16 and to decode the captured 2D barcodes.

The second apparatus 21 comprises a display screen 22, a processing system 24 and a camera 26. The processing system 24 has the ability to store information, to execute software and to encode a data to be transmitted into a 2D barcode. The processing system 24 also has the ability to capture 2D barcodes of other apparatuses through the camera 26 and to decode the captured 2D barcodes.

Figure 2:
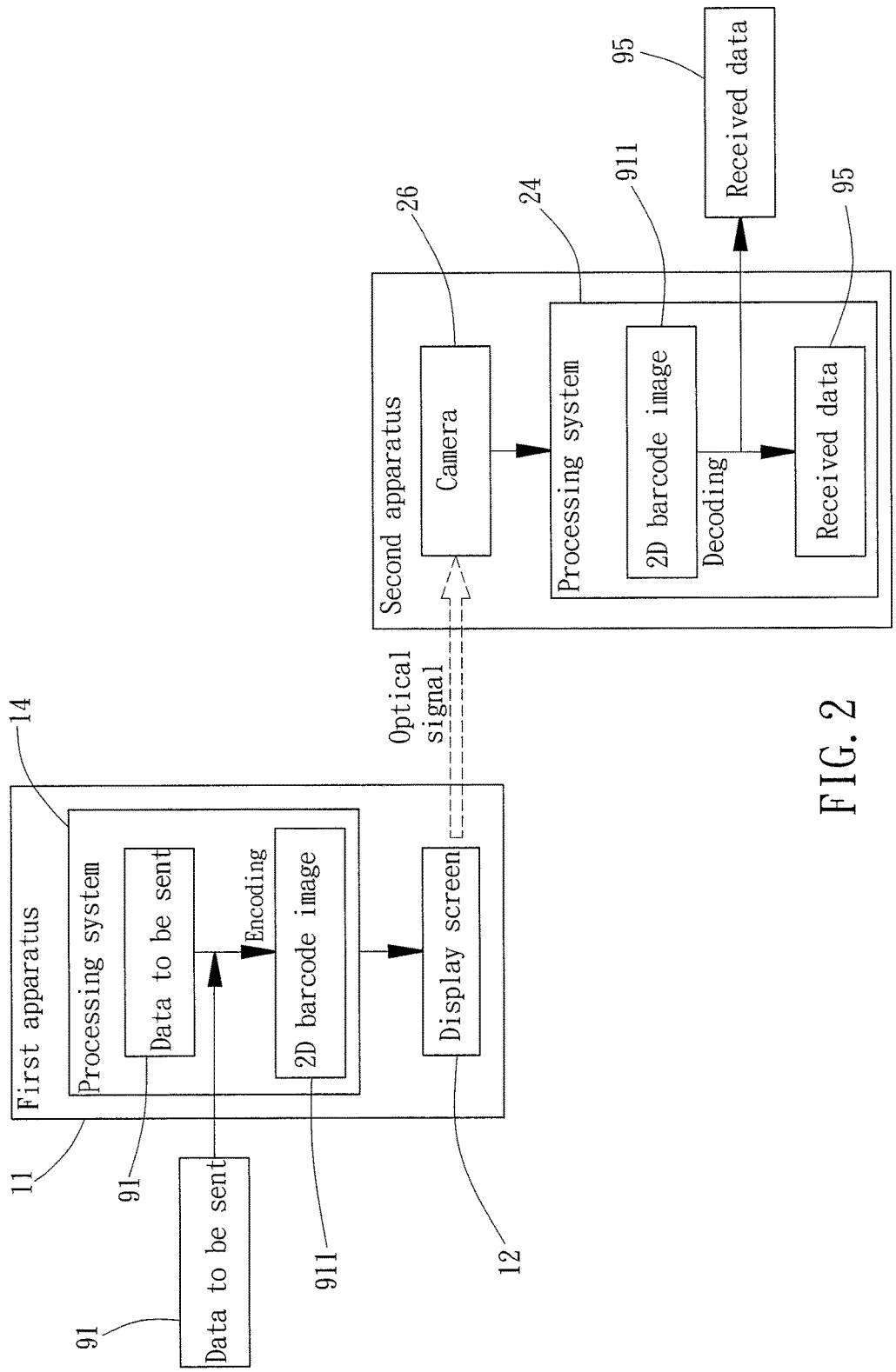
FIG. 2 is a schematic operation diagram illustrating one application example of the 2D barcode-based bi-directional wireless transmission system in accordance with the present invention.
Figure 3:
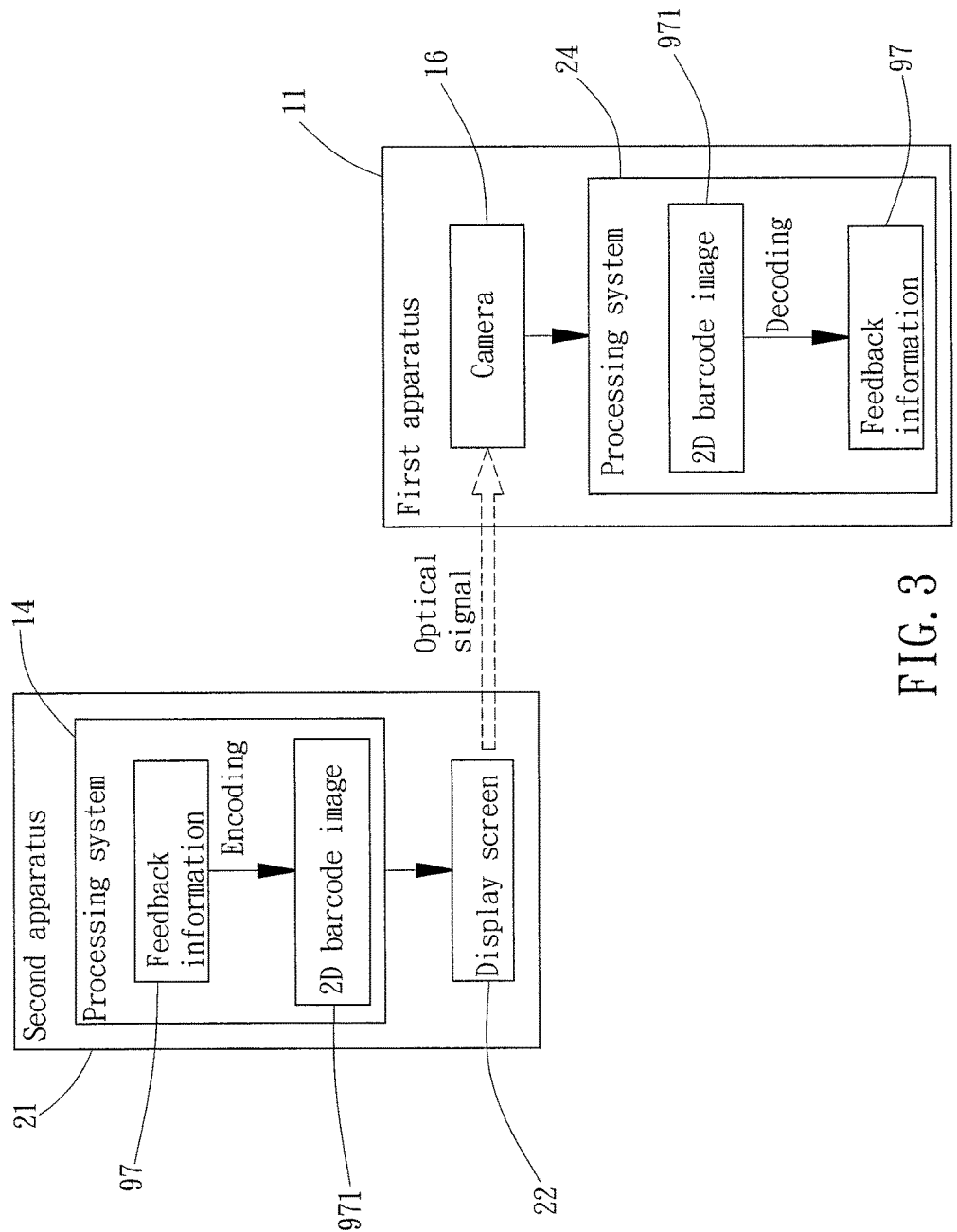
FIG. 3 is a schematic operation diagram illustrating another application example of the 2D barcode-based bi-directional wireless transmission system.
Figure 4:
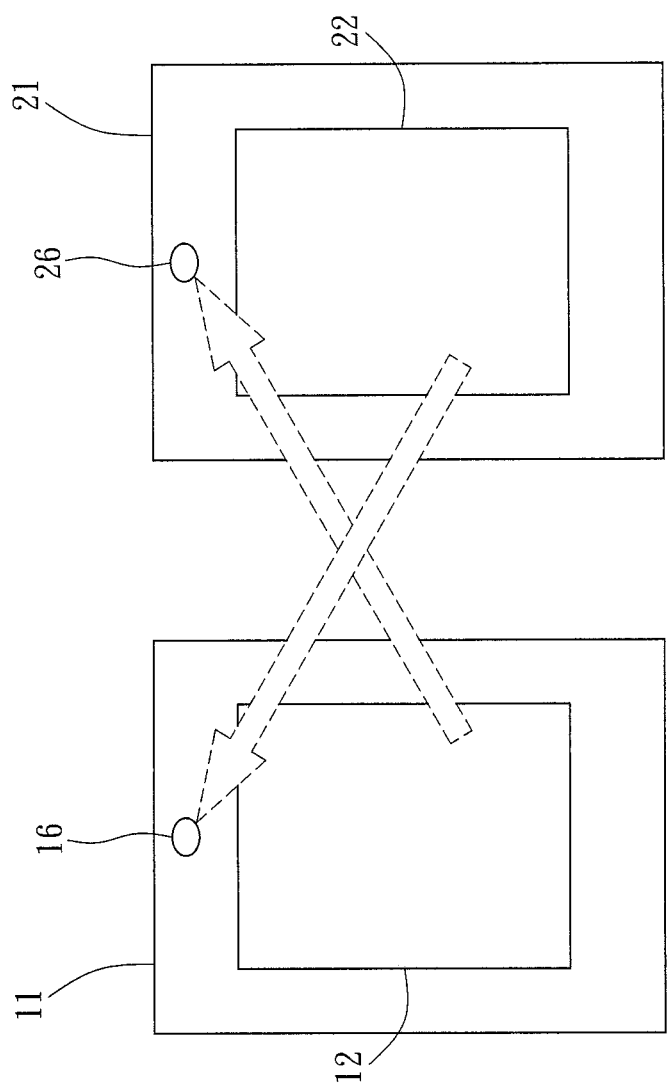
FIG. 4 is a schematic drawing illustrating a status of use of the 2D barcode-based bi-directional wireless transmission system.

Further, as illustrated in FIG. 2, the first apparatus 11 encodes the data to be sent 91 into multiple 2D barcode images 911, and sequentially display these 2D barcode images 911 on the display screen 12. The data to be sent 91 can be an external data transmitted to the first apparatus 11, or an internal data stored in the first apparatus 11. In FIG. 2, the two paths of data to be sent 91 are displayed. The second apparatus 21 uses the camera 26 to photograph the display screen 12 of the first apparatus 11, thereby sequentially capturing the multiple 2D barcode images 911 of the first apparatus 11. Thereafter, the second apparatus 21 decodes these captured 2D barcode images 911 into a received data 95, and then stores the received data 95 or transmits the received data 95 to an external apparatus. In FIG. 2, the received data 95 being stored in the second apparatus 21 and the received data 95 being transmitted to an external apparatus are shown. The second apparatus 21 also encodes a feedback information 97 into a 2D barcode image 971, and displays this 2D barcode image 971 on the display screen 22. The first apparatus 11 uses the camera 16 to photograph the display screen 22 of the second apparatus 21, thereby capturing the 2D barcode image 971 of the feedback information 97. Thereafter, the first apparatus 11 decodes the captured 2D barcode image 971 to obtain the feedback information 97.

In the implementation, aim the camera 16 of the first apparatus 11 at the display screen 22 of the second apparatus 21 to take pictures, and also aim the camera 26 of the second apparatus 21 at the display screen 12 of the first apparatus 11 to take pictures. Further, the aforesaid multiple 2D barcode images 911 are decoded into multiple data corresponding to the respective 2D barcode images 911, and then these multiple data are integrated into the received data 95 through an integration means. The integration means can be an integration software built in the second apparatus 21 that merges the multiple data one after another to form the complete received data 95 where the content of the received data 95 corresponds to the data to be sent 91, or is identical to the data to be sent 91.

The aforesaid first apparatus 11 and second apparatus 21 can be respectively a smart phone, a personal computer system, a vehicle multimedia system, or an intelligent home appliance. In the present preferred embodiment, the first apparatus 11 and the second apparatus 21 are smart phones.

Referring to FIGS. 2-4 again, when the present invention is in operation, aim the camera 16 of the first apparatus 11 at the display screen 22 of the second apparatus 21 to take pictures, and also aim the camera 26 of the second apparatus 21 at the display screen 12 of the first apparatus 11 to take pictures. At the beginning of the transmission of data, the first apparatus 11 sequentially displays the encoded 2D barcode images 911, and then the second apparatus 21 sequentially captures these 2D barcode images 911. After decoding and integration, the received data 95 is recovered. After the second apparatus 21 received the complete data, the second apparatus 21 displays the 2D barcode image 971 of the feedback information 97 on display screen 22. After the first apparatus 11 captured the 2D barcode image 971, the first apparatus 11 decodes the captured the 2D barcode image 971, and obtains the content of the feedback information 97 of the second apparatus 21. The feedback can be set here to mean "the receiving status", and thus, the first apparatus 11 confirms the completion of the data transfer operation, and ends the transmission.

As described above, the present invention utilizes the display screens 12,22 and cameras 16,26 of the first and second apparatus 11,21 and the medium of 2D barcodes to achieve bi-directional wireless data transmission, thereby eliminating the problems of interference and side recording that can be encountered in using the conventional radio frequency (RF) transmission technology.

It's worth mentioning that the invention is not limited to transferring data from the first apparatus 11 to the second apparatus 21, and the second apparatus 21 may transmit the data back to the first apparatus 11. In data transmission, the second apparatus 21 encodes a data to be sent 91 into multiple 2D barcode images 911, and then sequentially displays these multiple 2D barcode images 911 on the display screen 22. The first apparatus 11 sequentially captures the multiple 2D barcode images 911 of the second apparatus 21 by aiming the camera 16 at the display screen 22 of the second apparatus 21, and then decodes the captured 2D barcode images 911 into a received data 95 for storage. The first apparatus 11 encodes a feedback information 97 into a 2D barcode image 971, and then displays this 2D barcode image 971 on the display screen 12. The second apparatus 21 captures the 2D barcode image 971 of the feedback information 97 by aiming the camera 26 at the display screen 12 of the first apparatus 11. Thereafter, the second apparatus 21 decodes the captured 2D barcode image 971 so as to obtain the feedback information 97. Such an arrangement is contrary to the flow charts of FIGS. 2 and 3, and can be directly understood from FIGS. 2 and 3, and so, it is no longer represented graphically. Thus, the technique of the present invention allows the first apparatus 11 to transmit data to the second apparatus 21, and also allows the second apparatus 21 to transmit data to the first apparatus 11.

What is claimed is:

1. A 2D barcode-based bi-directional wireless transmission system, comprising:

a first apparatus comprising a first display screen, a first processing system and a first camera, the first processing system configured to store information, to execute software, to encode data to be transmitted into one or more 2D barcodes, to capture 2D barcodes of other apparatuses, and to decode the captured 2D barcodes;

a second apparatus comprising a second display screen, a second processing system and a second camera, the second processing system configured to store information, to execute software, to encode data to be transmitted into one or more 2D barcodes, to capture 2D barcode images of other apparatuses and to decode the captured 2D barcode images;

wherein said first apparatus is further configured to encode said data to be sent into multiple 2D barcode images, and then sequentially display said multiple 2D barcode images on the first display screen;

wherein said second apparatus is configured to use the second camera to photograph the first display screen so as to sequentially capture said multiple 2D barcode images from said first apparatus, and then decode the captured said multiple 2D barcode images into a received data for storage;

wherein said second apparatus is further configured to encode a feedback information into a first 2D barcode image and display the first 2D barcode image on the second display screen;

wherein said first apparatus is further configured to capture the first 2D barcode image of said feedback information by aiming the first camera at the second display screen and then decoding the captured first 2D barcode image of said feedback information so as to obtain said feedback information, and wherein said second apparatus is configured to encode the data to be sent into multiple 2D barcode images and sequentially display the multiple 2D barcode images on the second display screen;

wherein said first apparatus is configured to capture the multiple 2D barcode images from said second apparatus by aiming the first camera at the second display screen, and then decode the captured 2D barcode images into a second received data for storage;

wherein said first apparatus is configured to encode a second feedback information into a second 2D barcode image and display the second 2D barcode image on the first display screen; and wherein said second apparatus is configured to capture the 2D barcode image of said feedback information by aiming the second camera at the first display screen and then decoding the captured second 2D barcode image of said second feedback information so as to obtain said second feedback information.

2. The 2D barcode-based bi-directional wireless transmission system as claimed in claim 1, wherein: said first apparatus and said second apparatus comprise a smart phone, a personal computer system, a vehicle multimedia system or an intelligent home appliance.

3. The 2D barcode-based bi-directional wireless transmission system as claimed in claim 1, wherein: said first apparatus is configured to take pictures by aiming the first camera at the second display screen; and said second apparatus is configured to take pictures by aiming the second camera at the first display screen.

4. The 2D barcode-based bi-directional wireless transmission system as claimed in claim 1, wherein the multiple 2D barcode images are decoded into multiple data corresponding to the respective said 2D barcode images, and then the multiple data are integrated into the received data through an integration means.

* * * * *